United States Patent
Bauer

(10) Patent No.: US 11,519,491 B2
(45) Date of Patent: Dec. 6, 2022

(54) GEAR UNIT WITH REDUCED POWER LOSS, OPERATING METHOD AND INDUSTRIAL APPLICATION

(71) Applicant: Flender GmbH, Bocholt (DE)

(72) Inventor: Björn Bauer, Essen (DE)

(73) Assignee: Flender GmbH, Bocholt (DE)

( * ) Notice: Subject to any disclaimer, the term of this patent is extended or adjusted under 35 U.S.C. 154(b) by 205 days.

(21) Appl. No.: 16/864,845

(22) Filed: May 1, 2020

(65) Prior Publication Data

US 2020/0347928 A1 Nov. 5, 2020

(30) Foreign Application Priority Data

May 2, 2019 (EP) .................................. 19172281

(51) Int. Cl.
*F16H 57/04* (2010.01)
*F03D 9/25* (2016.01)
*F03D 15/00* (2016.01)
*F03G 7/06* (2006.01)

(52) U.S. Cl.
CPC .......... *F16H 57/0447* (2013.01); *F03D 9/25* (2016.05); *F03D 15/00* (2016.05); *F03G 7/065* (2013.01); *F16H 57/0457* (2013.01); *F16H 57/0495* (2013.01)

(58) Field of Classification Search
CPC ........ F03D 9/25; F03D 15/00; F16H 57/0447; F16H 57/0457; F16H 57/0495; F03G 7/065
See application file for complete search history.

(56) References Cited

U.S. PATENT DOCUMENTS

| 10,151,301 | B2 * | 12/2018 | Caponetti | F03D 7/042 |
| 2005/0272547 | A1 * | 12/2005 | House | B60K 6/40 475/5 |
| 2010/0270798 | A1 * | 10/2010 | Poulsen | H02P 9/14 290/44 |
| 2012/0064784 | A1 * | 3/2012 | Martens | B63J 3/02 440/75 |
| 2014/0015252 | A1 * | 1/2014 | Zhu | F03D 7/0288 290/44 |
| 2015/0322926 | A1 * | 11/2015 | Caponetti | F03D 13/20 416/1 |
| 2017/0122427 | A1 | 5/2017 | Valente | |

FOREIGN PATENT DOCUMENTS

| CN | 109296741 A | 2/2019 |
| DE | 19644738 A1 | 4/1998 |
| DE | 10238000 B4 | 5/2007 |

(Continued)

OTHER PUBLICATIONS

English Translation JP2010038304A (Year: 2010).*

(Continued)

*Primary Examiner* — Shafiq Mian
(74) *Attorney, Agent, or Firm* — Henry M. Feiereisen LLC

(57) ABSTRACT

A gear unit includes a toothed wheel, a reservoir receiving lubricant for lubricating the toothed wheel, a displacement body configured to set a lubricant level in the reservoir, and an actuator configured to move the displacement body as a function of a temperature as the displacement body is wetted with the lubricant.

20 Claims, 6 Drawing Sheets

(56) References Cited

FOREIGN PATENT DOCUMENTS

| DE | 102007005523 A1 | | 8/2008 |
|---|---|---|---|
| EP | 1389697 | | 2/2004 |
| JP | H0874973 | | 3/1996 |
| JP | 2010038304 A | * | 2/2010 |
| JP | 2010038304 A | | 2/2010 |
| KR | 20020050491 A | | 7/2002 |

OTHER PUBLICATIONS

Björn Bauer, Ruhr-Universität Bochum: Dissertation mit dem Titel „Formgedächtnistegierungen in der Antriebstechnik: Aktoren m Getrieben und Kupplungen; Kerbwirkungszahlen; Bochum 2010; pp. 1-347; ISBN 3-89194-194-3 (2019Q21311).
Chinese Search Report dated Sep. 5, 2022 with respect to counterpart Chinese patent application 202010367877X.
Translation of Chinese Search Report dated Sep. 5, 2022 with respect to counterpart Chinese patent application 202010367877X.

* cited by examiner

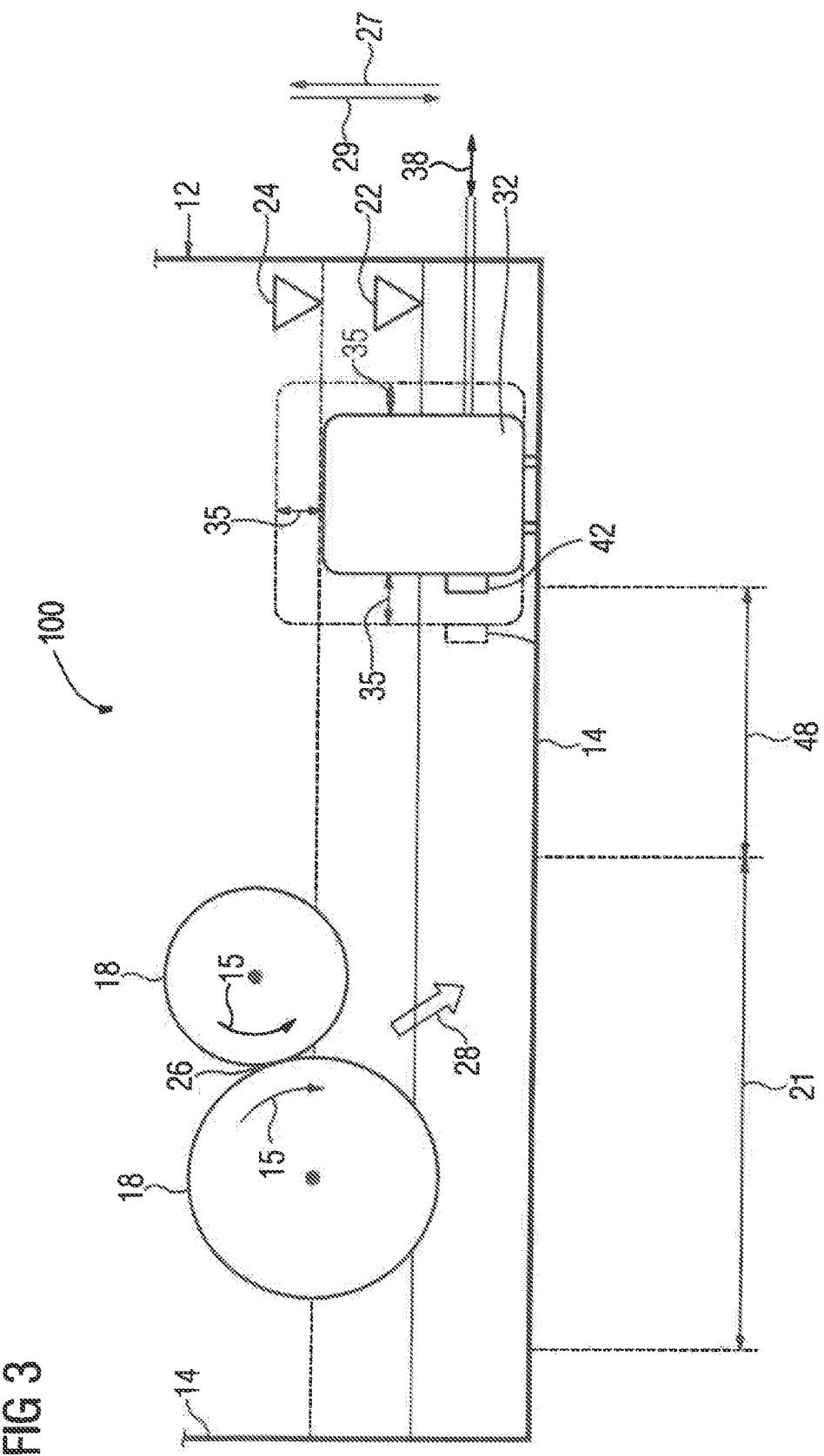

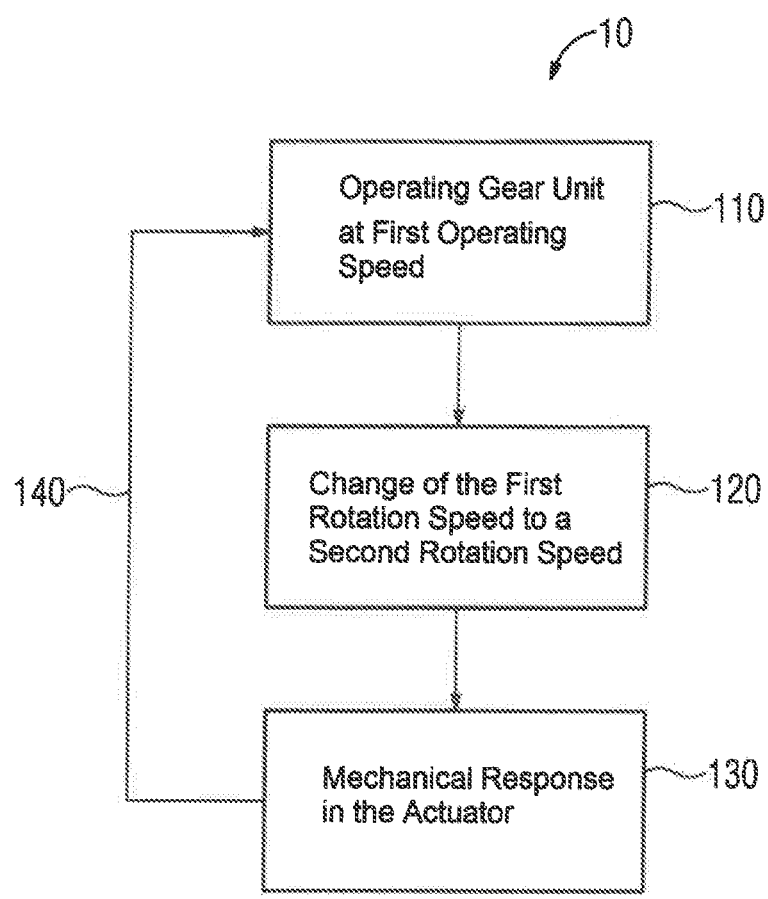

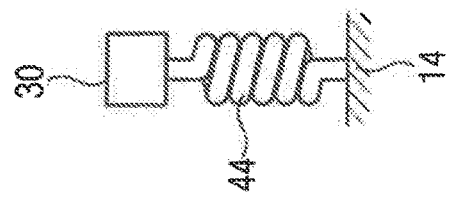
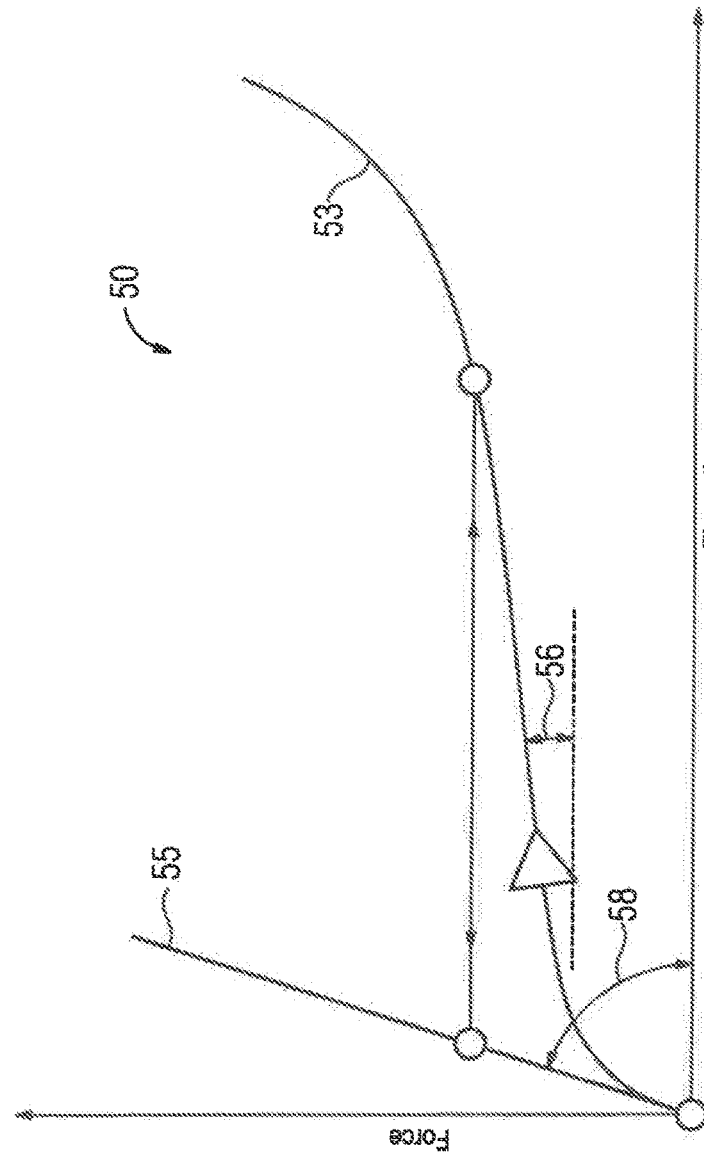
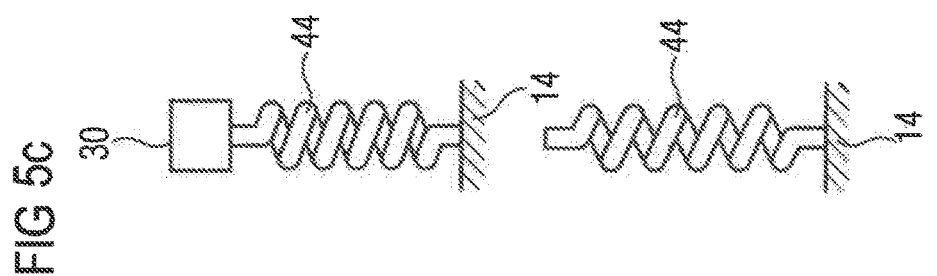

GEAR UNIT WITH REDUCED POWER LOSS, OPERATING METHOD AND INDUSTRIAL APPLICATION

CROSS-REFERENCES TO RELATED APPLICATIONS

This application claims the priority of European Patent Application, Serial No. 19172281.8, filed May 2, 2019, pursuant to 35 U.S.C. 119(a)-(d), the disclosure of which is incorporated herein by reference in its entirety as if fully set forth herein.

BACKGROUND OF THE INVENTION

The present invention relates to a gear unit and to an industrial application equipped with such a gear unit.

The following discussion of related art is provided to assist the reader in understanding the advantages of the invention, and is not to be construed as an admission that this related art is prior art to this invention.

In numerous areas of application, for example industrial applications, there is a need for gear units suitable for adapting a prevailing oil level to varying conditions and requirements. In this context, high demands are made of the reliability of the gear units, their ease of maintenance and their cost effectiveness.

It would therefore be desirable and advantageous to provide an improved gear unit to obviate prior art shortcomings.

SUMMARY OF THE INVENTION

According to one aspect of the present invention, a gear unit includes a toothed wheel, a reservoir receiving lubricant for lubricating the toothed wheel, a displacement body configured to set a lubricant level in the reservoir, and an actuator configured to move the displacement body as a function of a temperature as the displacement body is wetted with the lubricant.

A gear unit in accordance with the present invention can have a casing in which a plurality of toothed wheels is received in a torque transmitting manner. At least one portion of the casing takes the form of a reservoir that is constructed to receive a lubricant such as oil. During operation of the gear unit, the lubricant serves to lubricate and cool the toothed wheels. Received in the gear unit is a lubricant vessel that ensures a minimum level of the lubricant. Moreover, arranged in the gear unit is a displacement body that is constructed to be at least partly immersed in the lubricant. The displacement of lubricant is caused, for example, by immersing the displacement body or by enlarging the displacement body, thereby leading to a rise in the lubricant level. Conversely, at least partly removing the displacement body or making it smaller results in a drop in the lubricant level. The lubricant level can thus be set by the displacement body.

According to another advantageous feature of the present invention, the actuator can be constructed to directly or indirectly move the displacement body. In this context, moving the displacement body includes at least partly immersing it in the lubricant and at least partly removing it from the lubricant. The actuator can be constructed to move the displacement body in a manner dependent on temperature. For this purpose, the actuator is actuated as it is welled by the lubricant. A thermal action of the lubricant on the actuator triggers hereby a movement of the displacement body. The actuator can be mounted in the gear unit such as to be at least partly immersed in the lubricant. Further, the actuator is constructed, in the event of a rise in temperature caused by being wetted with the lubricant, to trigger a mechanical response in the actuator, and in the event of a drop in temperature to trigger an opposite mechanical response in the actuator. The rise and drop in temperature are caused by thermal conduction between the actuator and the lubricant.

Consequently, the movement of the displacement body can be directly specified by the actuator and thus also the lubricant level being established in the gear unit. The actuator automatically adjusts the lubricant level so that there is no need for an external controller. A gear unit according to the invention thus enables a reliable setting of the lubricant level with a minimum of component parts. Moreover, the reservoir for the lubricant can be constructed at many locations on the gear unit. The function of setting the lubricant level may be positioned at locations in the gear unit that do not cause any restriction on further structural requirements, or that are readily accessible. Thus, a gear unit according to the invention offers a high degree of flexibility in layout and hence a broad spectrum of possible uses, and can be integrated in numerous applications.

According to another advantageous feature of the present invention, the actuator can have a temperature-dependent modulus of elasticity. In the event of a rise in temperature, a material-dependent temperature causes an increase in the modulus of elasticity, and concludes when a temperature is reached, above which there is no further increase in the modulus of elasticity. As it cools and the temperature drops below a further material-dependent temperature, the modulus of elasticity returns back to the starting level. The modulus of elasticity is dependent on material and changes between a lower limit and an upper limit. The result is a variable elastic behavior in the actuator, which in turn can be converted into a mechanical response. Consequently, the mechanical behavior of the actuator can be calculated in a simple manner and adapted to a lame number of intended uses.

According to another advantageous feature of the present invention, the displacement body may be embodied as an expansion body or as an immersible body. An expansion body may, for example, be configured in the form of a bubble that can be filled with gas or liquid and mounted in the reservoir. As a result of the mechanical response of the actuator, gas or liquid can be introduced into the expansion body to thereby enlarge the expansion body. As an alternative or in addition, the actuator may be configured in the form of a valve of the expansion body, with the valve at least partly immersed in the lubricant and caused to open or close in the event of a rise or drop in temperature. In this case, the actuator may itself form a component of the valve. It is possible to use ambient air as gas and lubricant as liquid, which does not cause any contamination of the lubricant in the reservoir when escaping from the expansion body.

According to another advantageous feature of the present invention, the actuator can be arranged in the reservoir in a region of a toothed wheel. The actuator may hereby be connected to the casing and partly or entirely immersed in the lubricant in the reservoir. Advantageously, the actuator may be mounted in the reservoir in a region in which a backflow of lubricant from the toothed wheels reaches the reservoir. The lubricant in the backflow is at a temperature that is caused substantially directly by the load on the toothed wheels. For example, cooling effects are reduced by mixing with further lubricant in the region of a backflow into the reservoir. The actuator can be positioned such that a change in the temperature of the lubricant, corresponding to a change in the load on the gear unit, can be detected rapidly. The mechanical response of the actuator can thus be initiated with little delay, so that the lubricant level can be adjusted rapidly to the prevailing operating situation. In particular, losses caused by splashing as the rotation speed in the gear unit increases can be reduced. A gear unit according to the present invention is thus suitable for a more dynamic operating behavior while maintaining a same efficiency. Further, the actuator may be positioned at a location in the reservoir that is readily accessible for maintenance.

Advantageously, the actuator can also be positioned in the region of a toothed wheel. The expression "the region of a toothed wheel" should be understood to relate to a portion below the toothed wheel or to the side thereof into which lubricant is introduced after operation on a surface of the toothed wheel. The temperature of the lubricant in this region is substantially directly the result of the mechanical load on the toothed wheel. Thus, the effect of mixing with further lubricant is further reduced. As a result, the advantage of a rapid mechanical response by the actuator to the prevailing load on the gear unit is achieved to a greater extent.

According to another advantageous feature of the present invention, the actuator may have a contact region that is constructed to execute a temperature-dependent mechanical response as a result of being wetted with lubricant. The contact region may be a portion of the actuator itself, i.e. formed in one piece with the actuator. As an alternative or in addition, the contact region may also be configured in the form of a component that is connected to the actuator. Advantageously, the contact region may be made from a shape memory material in order to cause a temperature-dependent mechanical response. Examples of a shape memory material of this kind may include a nickel-titanium alloy or a nickel-titanium-copper alloy. Shape memory materials are constructed such that, in the event of a change in temperature, the proportions of austenite and martensite in their composition change and they undergo a structural transformation. As a result, for example the modulus of elasticity of the shape memory material is changed. It is thus possible to integrate the functions of the contact region and the actuator, thereby enabling a compact overall construction. The temperature-dependent behavior of shape memory materials does not require any additional sensors or control system, so that a high degree of reliability can be achieved. Their use is not sensitive, and shape memory materials can be used even under particularly harsh conditions. This further expands the field of application for a gear unit according to the invention. Moreover, the shape change behavior of shape memory materials is not subject to significant degradation, so as to last for as long as the service life of a gear unit is intended for operation. A gear unit according to the invention is thus of low maintenance. Moreover, an actuator using shape memory materials is able to attain relatively long travel distances and at the same time relatively high actuation forces. As a result, the actuator can easily be dimensioned to be sufficiently powerful without further aids.

According to another advantageous feature of the present invention, the actuator can be mechanically connected directly to the displacement body. In this case, the displacement body may be embodied as an immersible body. In this way, as a result of the temperature-dependent mechanical response of the actuator, the displacement body is immersed further into the lubricant, or emergence onto the surface of the lubricant is made possible. A direct mechanical connection between the actuator and the displacement body requires a smaller number of component parts, resulting in rapid and cost-efficient manufacture.

As an alternative or in addition, the actuator may also be connected to the displacement body via a transmission mechanism. A transmission mechanism may have at least one lever that allows the temperature-dependent mechanical response of the actuator to have an effect on the displacement body that is varied in respect of its deflection or power. An increase in the deflection or travel distance is associated with a reduction in the actuation force. Depending on the type of construction of the displacement body, different effects may be required in order to set the lubricant level in the desired manner. A gear unit according to the invention is therefore adjustable in a simple manner. Further, by using a suitable transmission mechanism, the need for high-cost shape memory materials can be reduced.

According to another advantageous feature of the present invention, the gear unit may also include a plurality of actuators connected to the immersible body, i.e. the displacement body. Actuators may hereby be used that are of identical or different configurations and connected to the displacement body and together cause a cumulative temperature-dependent mechanical response that allows the lubricant level to be set. In this way, the actuators can act as a modular system, which offers a broad range of ways in which a particular lubricant level may be matched with a particular temperature of the lubricant. This behavior of a gear unit according to the invention can be described using a temperature-dependent level characteristic curve. For stationary operation of the gear unit, the temperature-dependent level characteristic curve provides an unambiguous relationship between the prevailing temperature of the lubricant and the lubricant level that is to be set. Thus, it is possible to best suit different operating scenarios. A plurality of actuators also offers a high level of redundancy and hence of operational reliability.

According to another advantageous feature of the present invention, the actuator can be embodied as a spring, for example a helical spring. Springs may be configured as tension springs or pressure springs with a substantially linear behavior of elongation in relation to force. Springs are readily available in a wide variety of rigidity and size and also allow a plurality of springs to be combined easily. Moreover, a spring that is connected to the casing can be loaded with the dead weight of an immersible body and thus the lubricant level can be set in a simple manner. Springs also offer a low tendency to material fatigue so as to be reliable in operation over the service life of the gear unit. Moreover, springs have a high ratio of surface area to volume. As a result, a spring is suitable to rapidly absorb a change in temperature in the lubricant into which it is at least partly immersed and to reach thermal equilibrium. Consequently, the temperature-dependent mechanical response of the actuator can be initiated with less delay. Further, different types of springs may be selected to achieve a desired mechanical behavior. For example, helical springs are advantageous for achieving a long travel distance, while disk springs for example offer a high actuation force.

According to another aspect of the present invention, a method includes operating a gear unit in a first operating state at a first lubricant level in a lubricant-containing reservoir of the gear unit, setting a second operating state and detecting a temperature of the lubricant in the reservoir, and setting a second lubricant level in the reservoir as a function of the detected lubricant temperature by wetting an actuator in the reservoir with lubricant, causing a temperature-dependent movement of a displacement body by the actuator.

In accordance with a method of the present invention, a first step involves the gear unit to be operated in a first operating state. During operation in the first operating state, a first lubricant level is established that corresponds to a temperature of the lubricant. In a second step, a second operating state for the gear unit is set. During this, a temperature of the lubricant is detected, and this changes as a result of the second operating state being set. The temperature of the lubricant is hereby detected in the reservoir for the lubricant. In a third step, a second lubricant level is established that is adapted to the second operating state. The second lubricant level is hereby set as a function of the detected temperature of the lubricant.

The second lubricant level is established via the actuator. The actuator is constructed to move the displacement body as a function of temperature. Movement of the actuator depends on a temperature that is established at the actuator as a result of the actuator being wetted with the lubricant. The fact that the actuator is wetted with the lubricant results in a thermal conduction between the lubricant and the actuator. The temperature of the lubricant causes a mechanical response in the actuator to directly or indirectly move the displacement body.

As a result, depending on the current operating state, it is possible to adjust the lubricant level in the gear unit. Since the second lubricant level is lower than the first lubricant level, a low-loss operation is possible when the second rotation speed is greater than the first rotation speed. A method according to the present invention requires a minimum of components and for this reason can be implemented reliably and cost-efficiently.

According to another advantageous feature of the present invention, the first and second operating states may each be characterized by the rotation speed that prevails during the operating state. The rotation speed refers hereby to a toothed wheel in the gear unit. Thus, in the first operating state a first rotation speed and/or in the second operating state a second rotation speed may prevail, as a result of which different lubricant temperatures are realized during stationary operation. Moreover, a decrease of the second rotation speed is accompanied by a corresponding decrease of the second lubricant level. At high rotation speeds, this reduces losses caused by splashing, which in turn increases the efficiency of the gear unit. At reduced rotation speeds, the toothed wheels are, in turn, lubricated in a particularly advantageous manner as a result of a high second lubricant level.

Moreover, the first and second operating states may also be further characterized by different external temperatures or other operationally relevant factors that have an effect on the lubricant temperature. Consequently, a method according to the present invention is capable to easily respond to a thermal load on the lubricant that is the result of a considerable number of parameters.

According to another advantageous feature of the present invention the displacement body can be configured in the form of an expansion body. An expansion body may, for example, be a bubble that may be filled with gas or liquid. Filling or emptying of the expansion body may be realized by the actuator by, for example, its mechanical response that causes a pressure valve on the expansion body to be actuated. As an alternative or in addition, the displacement body may be configured in the form of an immersible body that is directly or indirectly immersed in or removed from the lubricant by the actuator. A displacement of lubricant caused by the displacement body acts effectively immediately throughout the gear unit. As a result, the displacement body may be positioned substantially at any location in the gear unit. The displacement body may be arranged at a spacing from toothed wheels in order to simplify the construction of the toothed wheels, i.e. without imposing any additional restrictions on overall space. The present invention is thus adaptable to a large number of gear units, and hence areas of use, in a simple manner.

According to another advantageous feature of the present invention, the second lubricant level may be set automatically in the third step. This should be understood to mean that the movement of the displacement body is implemented exclusively by the actuator. The need for control units or regulating units can thus be eliminated. Moreover, there is a substantially direct relationship between the operating state of the gear unit and the lubricant level. A faulty movement of the displacement body can thus be ruled out. A gear unit according to the present invention is thus less complex and very reliable.

According to another advantageous feature of the present invention, in the second step the temperature of the lubricant can be detected by the actuator itself. For this purpose, the actuator has a contact region that may be formed in one piece with the actuator, i.e. constituting substantially a portion of the actuator. As an alternative, the contact region may also be a component connected to the actuator. In order to cause a mechanical response by the actuator to a change in temperature, the contact region can be made of shape memory material. Examples of shape memory materials of this kind include a nickel-titanium alloy or a nickel-titanium-copper alloy. Shape memory materials offer, at relatively small differences in temperature, relatively great amounts of deformation or changes in properties, which may be used as a mechanical response by way of which a displacement body can be moved. Further, shape memory materials are not subject to significant degradation as a result of repeated thermal loading. Thus, shape memory materials are reliable and offer a long service life. Their use does not result in a significant increase in the complexity of a gear unit, which also has the effect of making it highly cost-effective.

According to still another aspect of the present invention, an industrial application includes a drive unit, an output unit, and a gear unit configured to connect the drive unit to the output unit in a torque transmitting manner, with the gear unit including a toothed wheel, a reservoir receiving lubricant for lubricating the toothed wheel, a displacement body configured to set a lubricant level in the reservoir, and an actuator configured to move the displacement body as a function of a temperature as the displacement body is wetted with the lubricant.

The drive unit can be, for example, configured as an electric motor, an internal combustion engine or as a hydraulic motor, and can be constructed to provide the drive power required for operating the output unit. The output unit may be embodied, for example, as a mill, vertical mill, sugar mill, cement mill, rock crusher, conveyor belt, pump, roller mill, apron conveyor, tube mill, rotary kiln, rotator, agitator, lifting device, garbage compactor or scrap crusher. The drive power is affected by the gear unit in respect of rotation speed and torque.

According to still another aspect of the present invention, a wind turbine includes a generator, a rotor, and a gear unit configured to connect the generator to the rotor in a torque transmitting manner, with the gear unit including a toothed wheel, a reservoir receiving lubricant for lubricating the toothed wheel, a displacement body configured to set a lubricant level in the reservoir, and an actuator configured to move the displacement body as a function of a temperature as the displacement body is wetted with the lubricant.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a schematic view of a second embodiment of a gear unit according to the present invention;

FIG. 4 is a flow chart depicting various steps of a method according to the present invention;

FIG. 5 is a graphical illustration of the thermal behavior of an actuator to a third embodiment of a gear unit according to the present invention;

FIGS. 5a-c are detailed cutaway views of an actuator in the form of a spring of the gear unit of FIG. 1 in various states;

DETAILED DESCRIPTION OF PREFERRED EMBODIMENTS

Figure 1:
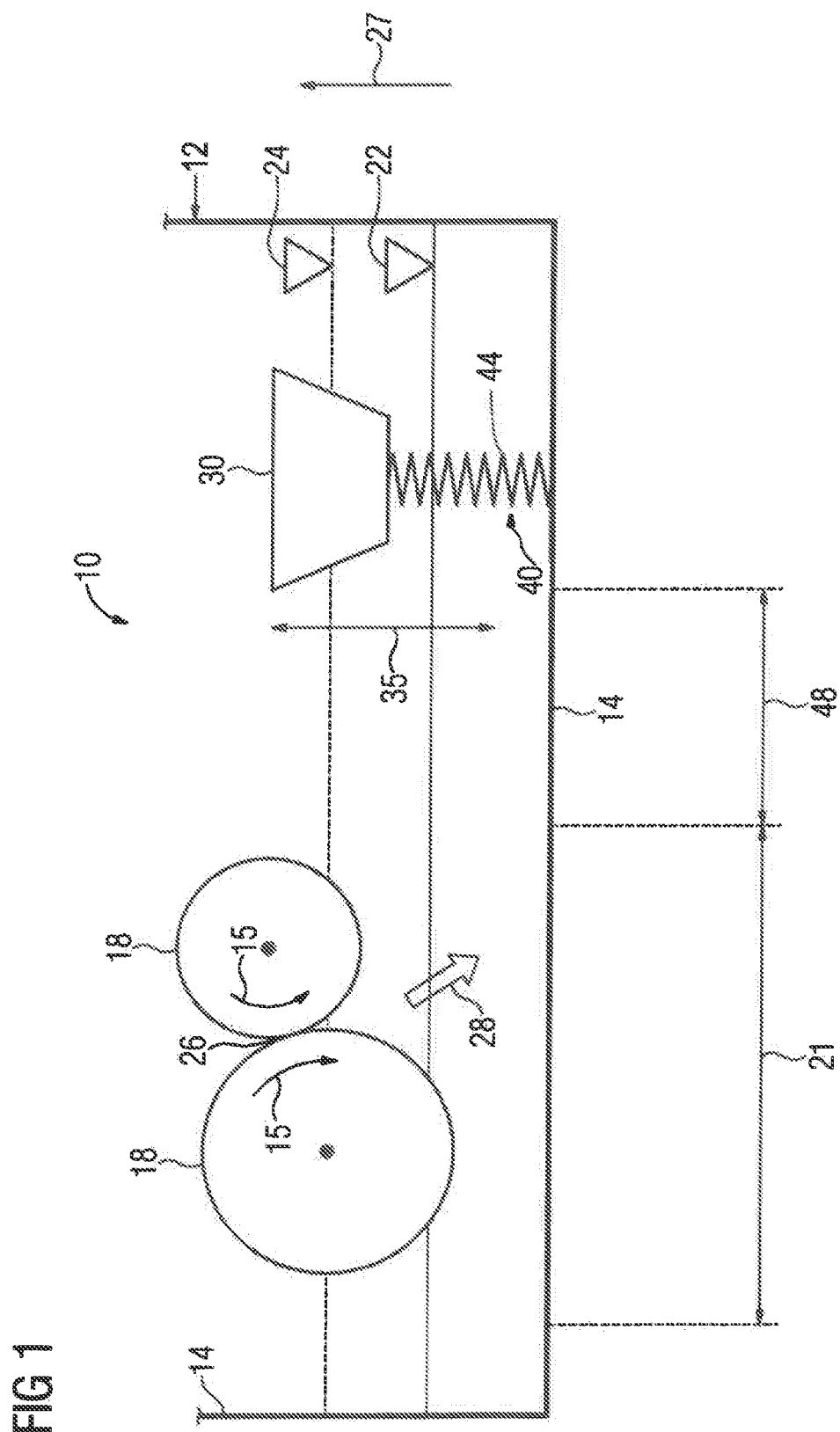
FIG. 1 is a schematic view of a first embodiment of a gear unit according to the present invention in a first operating state.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic view of a first embodiment of a gear unit according to the present invention, generally designated by reference numeral 10. The gear unit 10 is shown here in a first operating state and includes a casing 12, which includes a plurality of casing walls 14 to define a reservoir for holding a lubricant. Toothed wheels 18 are received in the casing 12 in a torque transmitting manner. The toothed wheels 18 are caused to rotate during operation as indicated by arrow 15. In the first operating state, a toothed wheel 18 of the gear unit 10 operates at a first rotation speed. The toothed wheel 18 dips into the lubricant within the reservoir of the casing 12, thereby establishing a first lubricant level 22 at the first rotation speed. The toothed wheel 18 that dips into the first lubricant level 22 causes lubricant to be transported to a contact point 26 with a further toothed wheel 18 to ensure lubrication. During operation of the gear unit 10, heat is generated and flows in a direction of arrow 28 from at least one toothed wheel 18 to the lubricant in a region 21 of the toothed wheels 18 to thereby affect a temperature of the lubricant. During stationary operation, a first temperature of the lubricant is established.

The gear unit 10 further includes a displacement body 30 configured in the form of an immersible body of conical shape. The displacement body 30 is connected to the casing wall 14 by way of an actuator which is generally designated by reference numeral 40 and constructed to move the displacement body 30 in a direction of double arrow 35. The movement of the actuator 40 and hence of the displacement body 30 is thus a reversible lifting movement, as seen in FIG. 1 by arrow 35. In cooperation with the actuator 40, the displacement body 30 is constructed to be immersed in or raised out of the lubricant. The actuator 40 has a surface that is at least partly wetted by lubricant such that a thermal equilibrium can be achieved between the actuator 40 and the lubricant as a result of thermal conduction. The actuator 40 is embodied as a spring 44 that has a large surface area in relation to its volume, so that thermal equilibrium between the lubricant and the actuator 40 can quickly be reached. The surface of the actuator 40 that dips into the lubricant 20 thus serves as a contact region for the prevailing temperature of the lubricant.

The actuator 40 is made from a shape memory material that is configured to change at least one of its properties as a function of the prevailing temperature. The actuator 40 thus moves as a result of a mechanical response to the temperature of the lubricant. In the operating state of the gear unit 10 as shown in FIG. 1, the displacement body 30 is raised above the first lubricant level 22. In this case, the actuator 40 has an elevated modulus of elasticity, so that the spring 44, serving as a pressure spring, raises the displacement body 30 out of the lubricant. As a result of the displacement body 30 dipping into the lubricant, the first lubricant level 22 can be raised to a second lubricant level 24, with a rise in the lubricant level being indicated by arrow 27 and triggered by changing the temperature of the lubricant. The movement of the actuator 40 is initiated after a delay defined by a thermal propagation distance 48.

A change in temperature of the lubricant as caused by a flow of heat in the direction of arrow 28 from at least one of the toothed wheels 18 leads to a faster movement of the actuator 40 as the thermal propagation distance 48 becomes smaller. The closer the actuator 40 is positioned to the toothed wheels 18, the faster the movement of the actuator 40 as a temperature-dependent mechanical response. Operation of the gear unit 10 with the displacement body 30 being raised out of the lubricant causes reduced losses due to splashing, and thus ensures efficient operation at a high first rotation speed.

Figure 2:
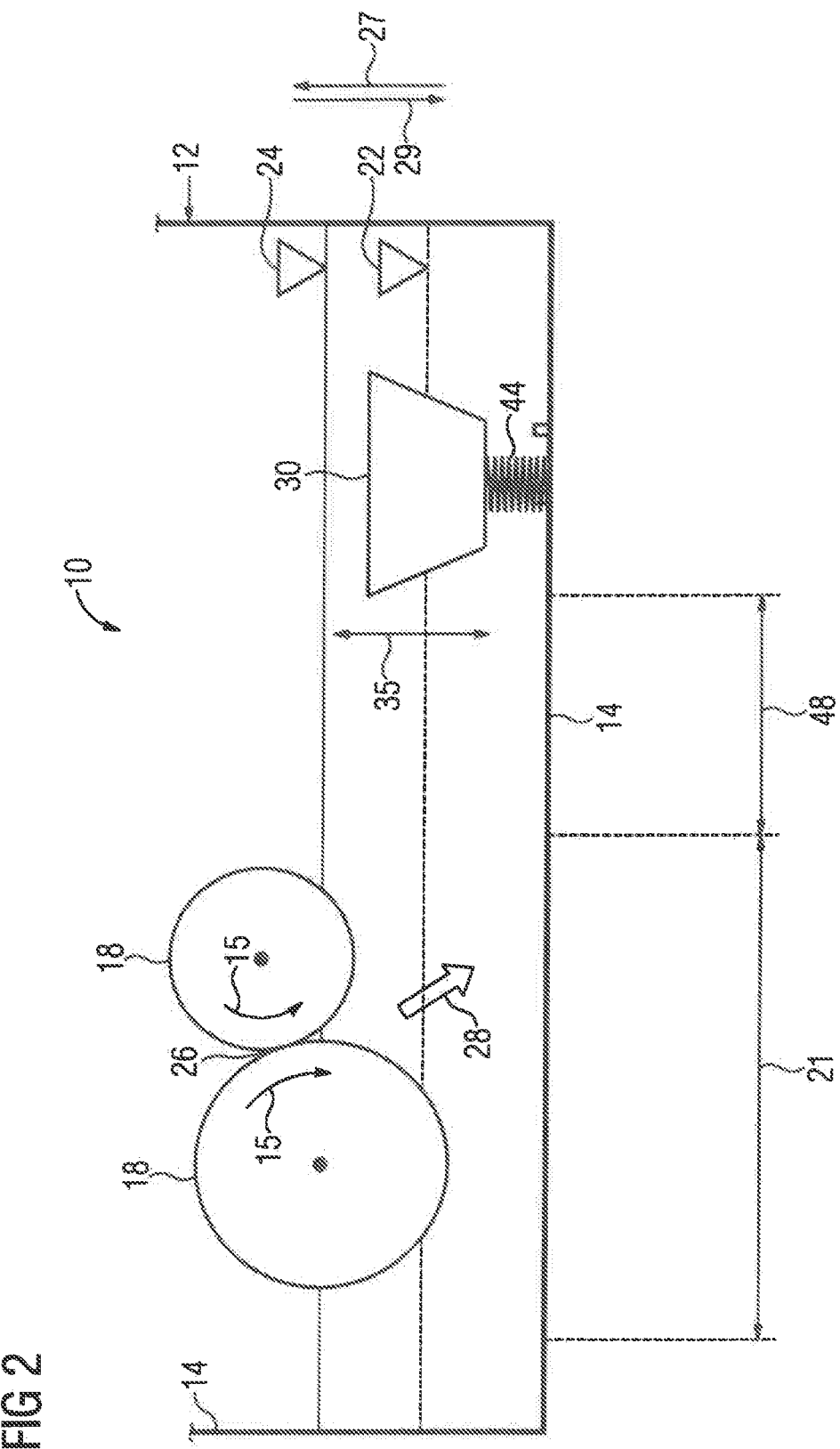
FIG. 2 is a schematic view of the gear unit in a second operating state.

FIG. 2 schematically shows the gear unit 10 in a second operating state. One of the toothed wheels 18 rotates at a second rotation speed that is lower than the first rotation speed. As a result of the reduced second rotation speed, less heat develops in the contact region 26 between the toothed wheels 18 at which lubrication takes place. The heat flow 28 introduced into the lubricant is thus also reduced by comparison with FIG. 1. Thus, the lubricant is at a second temperature which is lower than the first temperature in the first operating state.

The modulus of elasticity of the shape memory material of the actuator 40 decreases as the lubricant temperature drops from the first temperature to the second temperature. Consequently, the spring 44 of the actuator 40 is compressed by the displacement body 30 and thereby causes the actuator 40 and thus also the displacement body 30 to move, as a temperature-dependent response to the change from the first rotation speed of the toothed wheels 18 to the second rotation speed. The displacement body 30 in the form of an immersible body dips in the lubricant 20 to cause a rise in the lubricant level as indicated by the up arrow 27. As a consequence, the lubricant level rises from the lubricant level 22 to the higher lubricant level 24. The operating state illustrated in FIG. 2 is reversible in the event of a new rise in the temperature of the lubricant, due to a resultant drop of the lubricant level as indicated by down arrow 29. The smaller the thermal propagation distance 48 between the actuator 40 and the region 21 of the toothed wheels 18, the more quickly can a movement of the actuator 40 and thus of the displacement body 30 be initiated.

FIG. 3 illustrates a schematic view of a second embodiment of a gear unit according to the present invention, generally designated by reference numeral 100. Parts corresponding with those in FIGS. 1 and 2 are denoted by identical reference numerals. The gear unit 100 has a casing 12, which includes a plurality of casing walls 14 and in which toothed wheels 18 are received in a torque transmitting manner. The toothed wheels 18 are caused to rotate in a direction of arrow 15. In a first operating step, a toothed wheel 18 of the gear unit 100 operates at a first rotation speed and dips into lubricant that is received in a reservoir formed by the casing 12. As a result, a first lubricant level 22 is established at the first rotation speed. The toothed wheel 18 that dips into the first lubricant level 22 causes lubricant to be transported to a contact point 26 with a further toothed wheel 18 to ensure lubrication. During operation of the gear unit 100, a heat flow indicated by arrow 28 is generated via at least one toothed wheel 18 to the lubricant in a region 21 of the toothed wheels 18. A temperature of the lubricant is thus affected by the heat flow 28 from at least one toothed wheel 18. During stationary operation, a first temperature of the lubricant is established.

In the embodiment of the gear unit 100 of FIG. 3, provision is made of a displacement body 32 in the form of an expansion body which is connected to a casing wall 14. The expansion body 32 is embodied as a bubble that may be filled with fluid, in particular compressed air, as indicated by arrow 38. When being filled with fluid, the expansion body 32 can be enlarged from a contracted state to an expanded state which is indicated by a dash-dotted line. This expansion is reversible when draining fluid. When transitioning from the contracted state to the expanded state or vice versa, the expansion body 32 performs a movement indicated by arrows 35, as a result of which a transition between a first lubricant level 22 and a second lubricant level 24 can be implemented. When the displacement body 32 assumes the contracted state, the lubricant level in the reservoir is at the first lubricant level 22, which is lower than the second lubricant level 24 when the displacement body 32 assumes the expanded state. The displacement body 32 has an actuator 42 configured in the form of a valve. A portion of the actuator 42 forms a contact region made from a shape memory material. When the actuator 42 is wetted with lubricant, the temperature of the lubricant is detected by the actuator 40. Depending on the prevailing temperature of the lubricant, a change in a property of the actuator 40—for example its modulus of elasticity—triggers a mechanical response. The valve 42 can be opened as a function of the temperature in order to drain fluid and thus to make the displacement body 30 smaller so as to assume the contracted state. As a consequence, the lubricant level drops as indicated by down arrow 29.

Conversely, as a function of the temperature of the lubricant, the valve 42 can be closed so that the displacement body 32 transitions to the expanded state as fluid is supplied. This allows a rise in the lubricant level as indicated by the up arrow 27. As a function of the first and second rotation speeds, it is thus possible to adjust the lubricant level to the lower first lubricant level 22 and the higher second lubricant level 24. The closer the displacement body 32 is arranged to the region 21 of the toothed wheels 18, the more quickly can the movement, indicated by arrows 35, be triggered by the displacement body 32. A corresponding delay is determined by the length of a thermal propagation distance 48 in the lubricant.

Referring now to FIG. 4, there is shown a flow chart depicting various steps of a method according to the present invention, which can be applied, for example, to the operation of the gear unit 10 of FIGS. 1 and 2. It will be understood by a person skilled in the art that the principles described in the following description with respect to the gear unit 10 of FIGS. 1 and 2, are equally applicable to the gear unit 100 of FIG. 3. In a first method step 110, the gear unit 10, having casing 12 which serves as reservoir for lubricant, is operated at a first rotation speed. As a result, the first lubricant level 22 is set in the gear unit 10, with the lubricant assuming the first temperature.

In a second method step 120, the first rotation speed is changed to a second rotation speed. Depending on whether the second rotation speed is higher or lower than the first rotation speed, a higher or lower second lubricant level is correspondingly sought. Likewise, as the gear unit 10 transitions from the first rotation speed to the second rotation speed, the lubricant temperature transitions from the first temperature to a second temperature. In the second method step 120, the prevailing temperature of the lubricant in the reservoir formed by the casing 12 is also detected. The temperature is hereby detected via a contact region that is associated with the actuator 40 and is made from a shape memory material. The contact region and hence the actuator 40 are for this purpose at least partly wetted with lubricant that is received in the gear unit 10.

In a third method step 130, as a result of detecting the temperature of the lubricant, a mechanical response is triggered in the actuator 40, and this response results in a movement of the actuator 40. The mechanical response of the actuator 40 is attributable to a temperature-dependent change in a property of the actuator 40. The actuator 40 is connected to the displacement body 30, which consequently is conjointly moved in the direction of arrow 35. As a result of the movement of the actuator 40 and the displacement body 30 in the lubricant, the second lubricant level 24 is set.

The third method step 130 is followed by a feedback loop 140 in which the second rotation speed prevailing in the third method step 130 and the prevailing second temperature in the lubricant are utilized as starting points for a new iteration of the previous steps 110, 120, 130.

FIG. 5 shows a graph 50 of a thermal behavior of the actuator 40 of the gear unit 10, with the actuator 40 made from a shape memory material. Again, for sake of simplicity, while the following description relates to the gear unit 10, the described principles are equally applicable to the gear unit 100. The actuator 40 in the form of spring 44, in particular a pressure spring, dips during operation at least partly into lubricant and is connected to a casing wall 14 of the gear unit 10. The gear unit 10 is in this case usable in an industrial application 60, shown by way of example in FIG. 6, or in a wind turbine 70, shown by way of example in FIG. 7. The graph 50 has a horizontal axis of elongation and a vertical axis of force. The graph 50 starts at a situation when the actuator 40 is unloaded, as illustrated in FIG. 5a. The graph 50 depicts a first characteristic curve 53, which shows the elongation behavior of the actuator 40 at the first temperature of the lubricant. When the actuator 40 is put under a pressure load caused by the dead weight of the displacement body 30 in the form of an immersible body, the actuator 40 becomes highly compressed. This is illustrated in FIG. 5b.

The graph 50 further shows a second characteristic curve 55 which reflects the elongation behavior of the actuator 40 at the second temperature of the lubricant. The actuator 40 behaves hereby more rigidly than in the case of the first characteristic curve 53. The dead weight of the displacement body 30 thus produces less compression than in the case of the first characteristic curve 53, as illustrated in FIG. 5c.

By changing the temperature of the lubricant, with the actuator 40 being at least partly dipped in the lubricant, one of the two characteristic curves 53, 55 become effective. The temperature is detected at the surface of the actuator 40, which surface constitutes the contact region. With the first characteristic curve 53, the actuator 40 has a first modulus of elasticity, indicated by double arrow 56 and substantially represented as the angle of a tangent to the first characteristic curve 53. Correspondingly, with the second characteristic curve 55, the actuator 40 has a second modulus of elasticity, indicated by double arrow 58 and being greater than the first modulus of elasticity. Since the actuator 40 is made from a shape memory material, the actuator 40 and consequently also the displacement body 30 can be moved in a definable range of the temperature. A transition to the first temperature results in a rise of the lubricant, whereas a transition to the second temperature results in a drop in the lubricant level, since the displacement body 30 is accordingly dipped into or raised out of the lubricant. As the actuator 40 is embodied as a spring 44, the actuator 40 has a large surface area in relation to its volume. A change in the temperature of the lubricant is thus rapidly reflected in the actuator 40. As a result, a transition from the first characteristic curve 53 to the second characteristic curve 55 and vice versa takes place rapidly. As a result, overall a temperature-dependent level characteristic curve of the gear unit 10 is defined.

Figure 6:
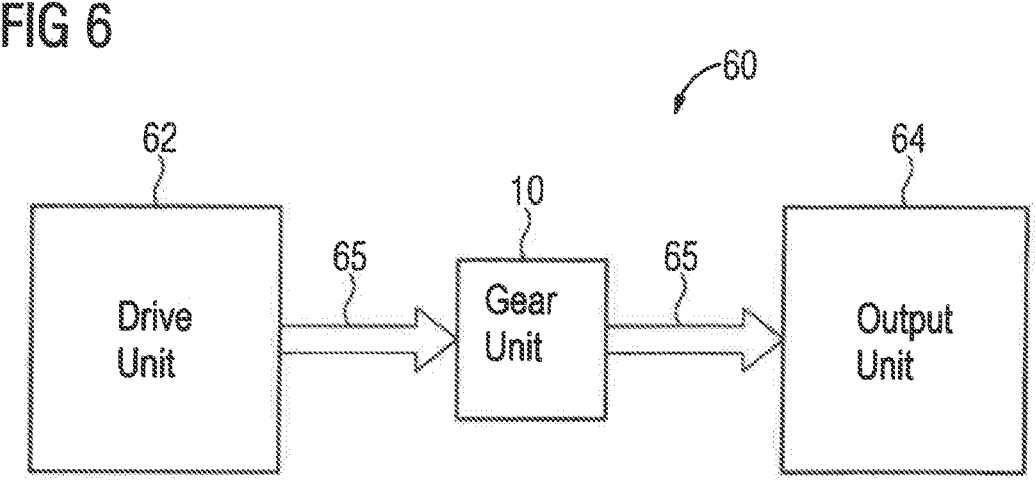
FIG. 6 is a schematic block diagram of an industrial application according to the present invention.

FIG. 6 is a schematic block diagram of an industrial application according to the present invention, generally designated by reference numeral 60 and including a drive unit 62 and an output unit 64 that are connected to one another in a torque transmitting manner by way of a gear unit, for example the afore-described gear unit 10. The drive unit 62 is constructed to provide a drive power required for operating the output unit 64. For this purpose, the drive unit 62 can be embodied, for example, as an electric motor, internal combustion engine or hydraulic motor. The output unit 64 is configured to implement a mechanical application. The output unit 64 is constructed accordingly depending on whether the industrial application 60 is for example a mill, vertical mill, sugar mill, cement mill, rock crusher, conveyor belt, pump, roller mill, apron conveyor, tube mill, rotary kiln, rotator, agitator, lifting device, garbage compactor or scrap crusher. As a result, the drive unit 62 and accordingly also the output unit 64 can be operated dynamically. The lubricant level 22, 24 is rapidly adaptable as a result of the gear unit 10. The dynamic behavior that is obtained during operation can be utilized for a flexible and hence cost-effective operation of the industrial application.

Figure 7:
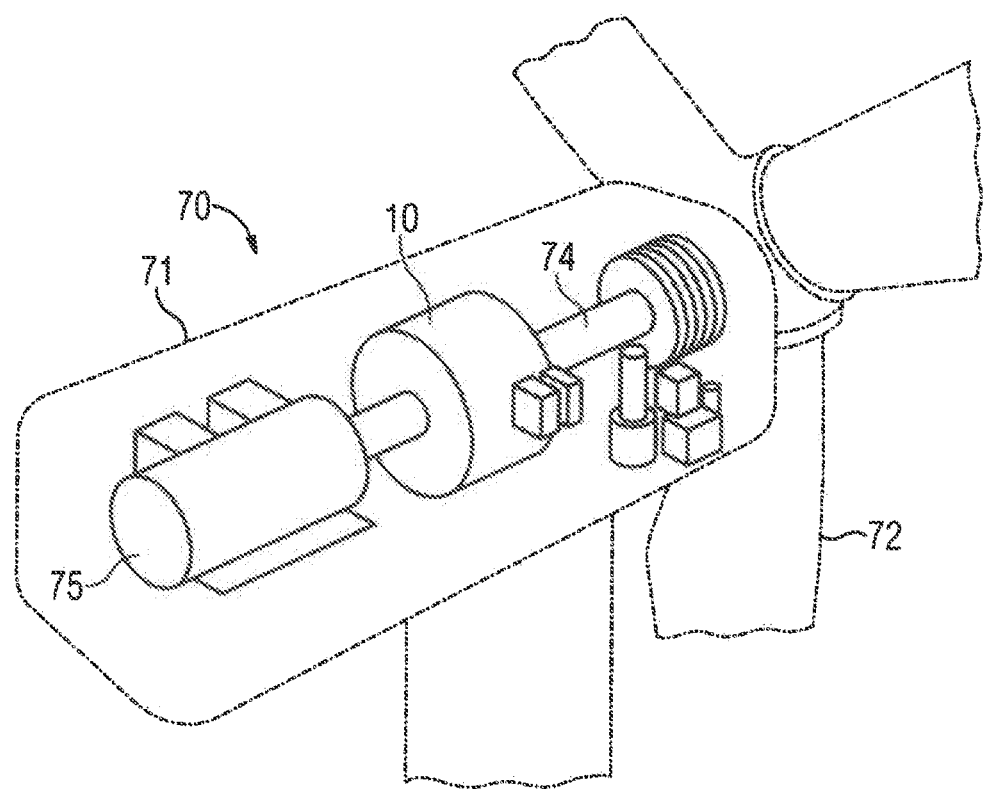
FIG. 7 is a schematic perspective representation of a wind turbine according to the present invention.

FIG. 7 is a schematic perspective representation of a wind turbine according to the present invention, generally designated by reference numeral 70. The wind turbine 70 has a rotor 72 that is mounted to rotate on a nacelle 71. The rotor 72 is connected to a rotor shaft 74 that drives a generator 75 by way of a gear unit, e.g. the gear unit 10 as described above. The gear unit 10 enables more dynamic operation for the wind turbine 70, which makes a higher yield of electricity possible without increasing the anticipated maintenance work.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A gear unit, comprising:
   a toothed wheel;
   a reservoir receiving lubricant for lubricating the toothed wheel;
   an immersible body configured to set a lubricant level in the reservoir by at least partly immersing the immersible body in or at least party removing the immersible body from the lubricant in the reservoir; and
   an actuator configured to move the immersible body as a function of a temperature of the lubricant as the immersible body is wetted with the lubricant.

2. The gear unit of claim 1, wherein the actuator has a temperature-dependent modulus of elasticity.

3. The gear unit of claim 1, wherein the immersible body is constructed as a bubble that can be filled with gas or liquid and is mounted in the reservoir.

4. The gear unit of claim 1, wherein the actuator is arranged in the reservoir in a region of the toothed wheel.

5. The gear unit of claim 1, wherein the actuator has a contact region that is made from a shape memory material.

6. The gear unit of claim 1, wherein the actuator is mechanically connected directly to the immersible body.

7. The gear unit of claim 1, further comprising a transmission mechanism, said actuator being mechanically connected to the immersible body via the transmission mechanism.

8. The gear unit of claim 3, further comprising a plurality of said actuator for establishing a temperature-dependent level characteristic curve, said immersible body being connected to the plurality of actuators.

9. The gear unit of claim 1, wherein the actuator includes a spring, in particular a helical spring, disk spring or solid-body spring.

10. A method, comprising:
    operating a gear unit in a first operating state at a first lubricant level in a lubricant-containing reservoir of the gear unit;
    setting a second operating state and detecting a temperature of the lubricant in the reservoir; and
    setting a second lubricant level in the reservoir as a function of the detected lubricant temperature by wetting an actuator in the reservoir with lubricant, causing a temperature-dependent movement of an immersible body by the actuator by at least partly immersing the immersible body in or at least partly removing the immersible body from the lubricant in the reservoir.

11. The method of claim 10, wherein the gear unit operates at a first rotation speed in the first operating state and at a second rotation speed in the second operating state.

12. The method of claim 10, further comprising configuring the immersible body as a bubble that can be filled with gas or liquid and is mounted in the reservoir.

13. The method of claim 10, wherein the second lubricant level is set automatically.

14. The method of claim 10, further comprising forming the actuator with a contact region made of a shape memory material to detect the lubricant temperature in the second operating state.

15. An industrial application, comprising:
a drive unit;
an output unit; and
a gear unit configured to connect the drive unit to the output unit in a torque transmitting manner, said gear unit comprising a toothed wheel, a reservoir receiving lubricant for lubricating the toothed wheel, an immersible body configured to set a lubricant level in the reservoir, and an actuator configured to move the immersible body as a function of a temperature of the lubricant as the immersible body is wetted with the lubricant by at least partly immersing the immersible body in or at least partly removing the immersible body from the lubricant in the reservoir.

16. The industrial application of claim 15, wherein the actuator has a temperature-dependent modulus of elasticity.

17. The industrial application of claim 15, wherein the immersible body is constructed as a bubble that can be filled with gas or liquid and is mounted in the reservoir.

18. The industrial application of claim 15, wherein the actuator has a contact region that is made from a shape memory material.

19. The industrial application of claim 15, wherein the actuator includes a spring, in particular a helical spring, disk spring or solid-body spring.

20. A wind turbine, comprising:
a generator;
a rotor; and
a gear unit configured to connect the generator to the rotor in a torque transmitting manner, said gear unit comprising a toothed wheel, a reservoir receiving lubricant for lubricating the toothed wheel, an immersible body configured to set a lubricant level in the reservoir, and an actuator configured to move the immersible body as a function of a temperature of the lubricant as the displacement body is wetted with the lubricant by at least partly immersing the immersible body in or at least partly removing the immersible body from the lubricant in the reservoir.

* * * * *